(12) United States Patent
Axe et al.

(10) Patent No.: US 8,370,197 B2
(45) Date of Patent: Feb. 5, 2013

(54) CONTROLLING THE SERVING OF ADVERTISEMENTS, SUCH AS COST PER IMPRESSION ADVERTISEMENTS FOR EXAMPLE, TO IMPROVE THE VALUE OF SUCH SERVES

(75) Inventors: Brian Axe, San Francisco, CA (US); Ross Koningstein, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 2034 days.

(21) Appl. No.: 11/241,818

(22) Filed: Sep. 30, 2005

(65) Prior Publication Data
US 2007/0078707 A1 Apr. 5, 2007

(51) Int. Cl.
*G06Q 30/00* (2012.01)
*G06Q 40/00* (2012.01)
*G06Q 50/00* (2012.01)

(52) U.S. Cl. .............. 705/14; 705/3; 705/10; 705/26; 705/37; 705/14.4; 705/14.41; 705/14.43; 705/14.48

(58) Field of Classification Search ................ 705/1–28
See application file for complete search history.

(56) References Cited

U.S. PATENT DOCUMENTS

| | | | | |
|---|---|---|---|---|
| 7,295,996 | B2 * | 11/2007 | Skinner ................ | 705/26.1 |
| 2004/0167816 | A1 * | 8/2004 | Kamath ................ | 705/14 |
| 2004/0225562 | A1 * | 11/2004 | Turner ................ | 705/14 |
| 2005/0065844 | A1 * | 3/2005 | Raj et al. ............ | 705/14 |
| 2005/0071224 | A1 | 3/2005 | Fikes | |
| 2005/0086105 | A1 * | 4/2005 | McFadden et al. ...... | 705/14 |
| 2005/0131758 | A1 | 6/2005 | Desikan | |
| 2006/0026060 | A1 * | 2/2006 | Collins ................ | 705/14 |

OTHER PUBLICATIONS

PCT/ISA/220, "Notification of Transmittal of the International Search Report and the Written Opinion of the International Searching Authority, or the Declaration" for PCT/US06/37487 mailed Aug. 27, 2007 (1 pg.).
PCT/ISA/210, "International Search Report" for PCT/US06/37487, mailed Aug. 27, 2007 (2 pgs.).
PCT/ISA/237, "Written Opinion of the International Searching Authority" for PCT/US06/37487, mailed Aug. 27, 2007 (5 pgs.).
First Examination Report for Indian Patent Application No. 864/MUMNP/2008, mailed Feb. 14, 2012 (1 pg.).
Examiner's Report for Canadian Patent Application No. 2,624,527, mailed Feb. 24, 2012 (5 pgs.).

* cited by examiner

*Primary Examiner* — William A Brandenburg
(74) *Attorney, Agent, or Firm* — John C. Pokotylo; Straub & Pokotylo

(57) ABSTRACT

A (e.g., expected) performance of proposed ad placement is compared with a performance threshold (either an initial threshold or an adjusted threshold). The ad may be served if the expected performance meets the threshold (perhaps subject to additional conditions), but is not served if the expected performance is less than the performance threshold. Spend information of the ad so served is analyzed to determine if a target amount (budget) is expected to be overspent or underspent. If the former, the performance threshold is increased (and/or the ad performance value is decreased). If the later, the performance threshold is decreased (and/or the ad performance value is increased).

38 Claims, 7 Drawing Sheets

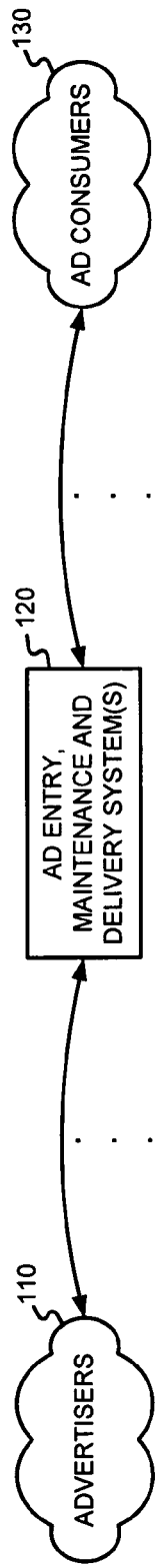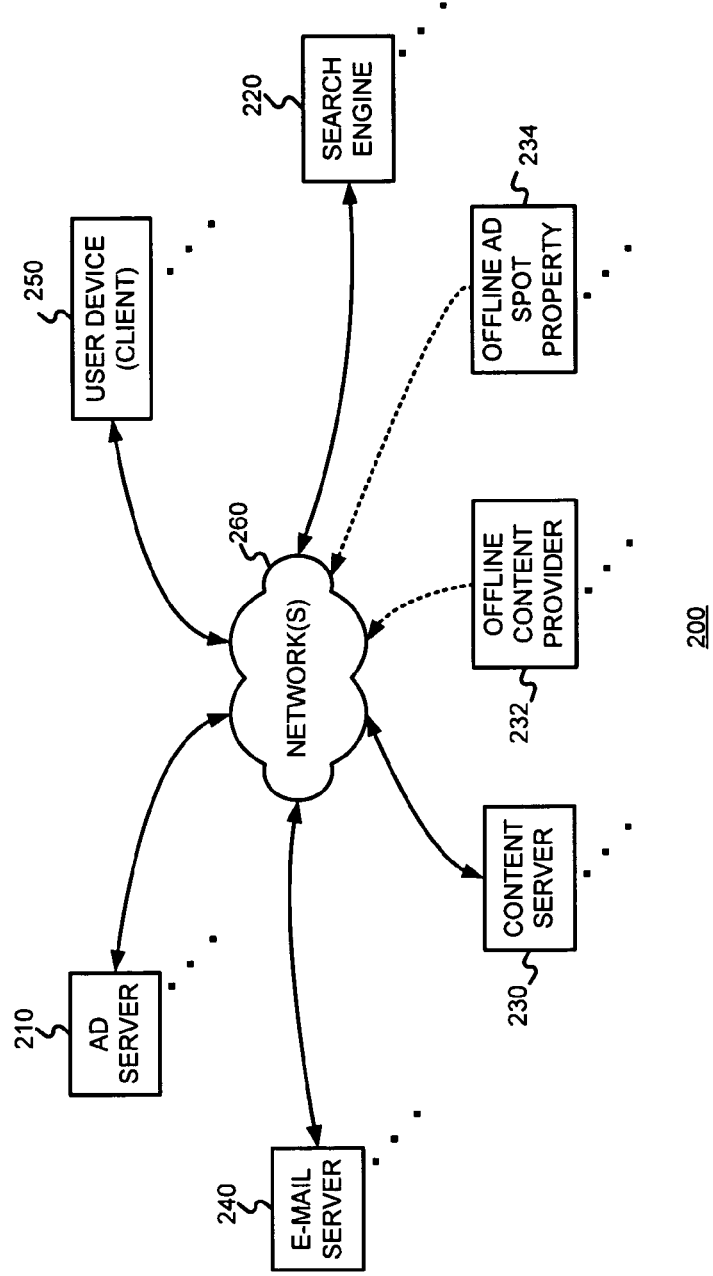

CONTROLLING THE SERVING OF ADVERTISEMENTS, SUCH AS COST PER IMPRESSION ADVERTISEMENTS FOR EXAMPLE, TO IMPROVE THE VALUE OF SUCH SERVES

§1. BACKGROUND OF THE INVENTION

§1.1 Field of the Invention

The present invention concerns advertising, such as online advertising for example. In particular, the present invention concerns improving the values of serving advertisements, such as cost per impression advertisements for example.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. No.: 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular. Moreover, advertising using other targeting techniques, and even untargeted online advertising, has become increasingly popular.

Initially, advertisers paid for online advertising on a cost per impression (or cost per 1,000 impressions, often referred to as "CPM") basis. However, since many advertisers value impressions that lead potential customers to their Website, many advertising networks adopted a pay per ad selection (often referred to as a cost per click (or "CPC") pricing model. Such a pricing model adequately reflected the value proposition of many advertisers. Further, since some sophisticated advertising networks such as AdWords and AdSense from Google use selection rate (e.g., selections per impressions, also referred to as click-through rate (or "CTR") in scoring ads competing for various ad spots, and CTR is a good indicator of the usefulness of an ad to end users, such a pricing model is also beneficial to end users.

Although many advertisers appreciate the CPC pricing model, some advertisers are interested mainly in branding and are therefore primarily concerned with ad impressions. Such advertisers would like to use a CPM pricing model. Moreover, often such advertisers would like to spend their budget. That is, if a CPM advertiser budgets $1,000 per week for an ad campaign, it would like to spend that entire amount, but not more. Most ad systems today are optimized to meet reservation commitments (e.g. 10,000 page views in the month of March).

Existing advertising systems, such as systems that use or support a CPM pricing model, could be improved. For example, although CPM advertisers are primarily concerned with impressions, many would find it useful to get better or more valuable impressions.

§2. SUMMARY OF THE INVENTION

Embodiments consistent with the present invention improve ad serving by adjusting a performance threshold such that a budgeted amount is spent exactly, or at least with that goal. For example, for ads served on the basis of cost per ad impression (or CPM), instead of randomly selecting a percentage of ad placements that meet certain targeting criteria for the particular ad, the expected performance of the ad is compared to a performance threshold, and the ad is only served in the target document if the expected performance meets the performance threshold.

In some embodiments consistent with the present invention, the performance is in terms of click through rate (CTR), and/or conversion rate (CR).

In some embodiments consistent with the present invention, spend information for the ad (or group of ads, such as in an ad campaign) is monitored, and if an underspend is expected, the performance threshold is decreased (and/or the expected performance is increased). This allows more ads to be served, though with less "valuable" ad impressions (e.g., in terms of lower CTR, CR, or some other indicator or combination of indicators of advertiser and/or end user value, etc.). However, underspend of a target amount (budget) is avoided. Conversely, if an overspend is expected, the performance threshold is increased (and/or the expected performance is decreased), thereby reducing the number of instances of the ad being served, but increasing the value (e.g., in terms of higher CTR, CR, etc.) of those impressions.

§3. BRIEF DESCRIPTION OF THE DRAWINGS

FIG. 1 is a diagram showing parties or entities that can interact with an advertising system.

FIG. 2 is a diagram illustrating an environment in which, or with which, embodiments consistent with the present invention may operate.

§4. DETAILED DESCRIPTION

Figure 3:
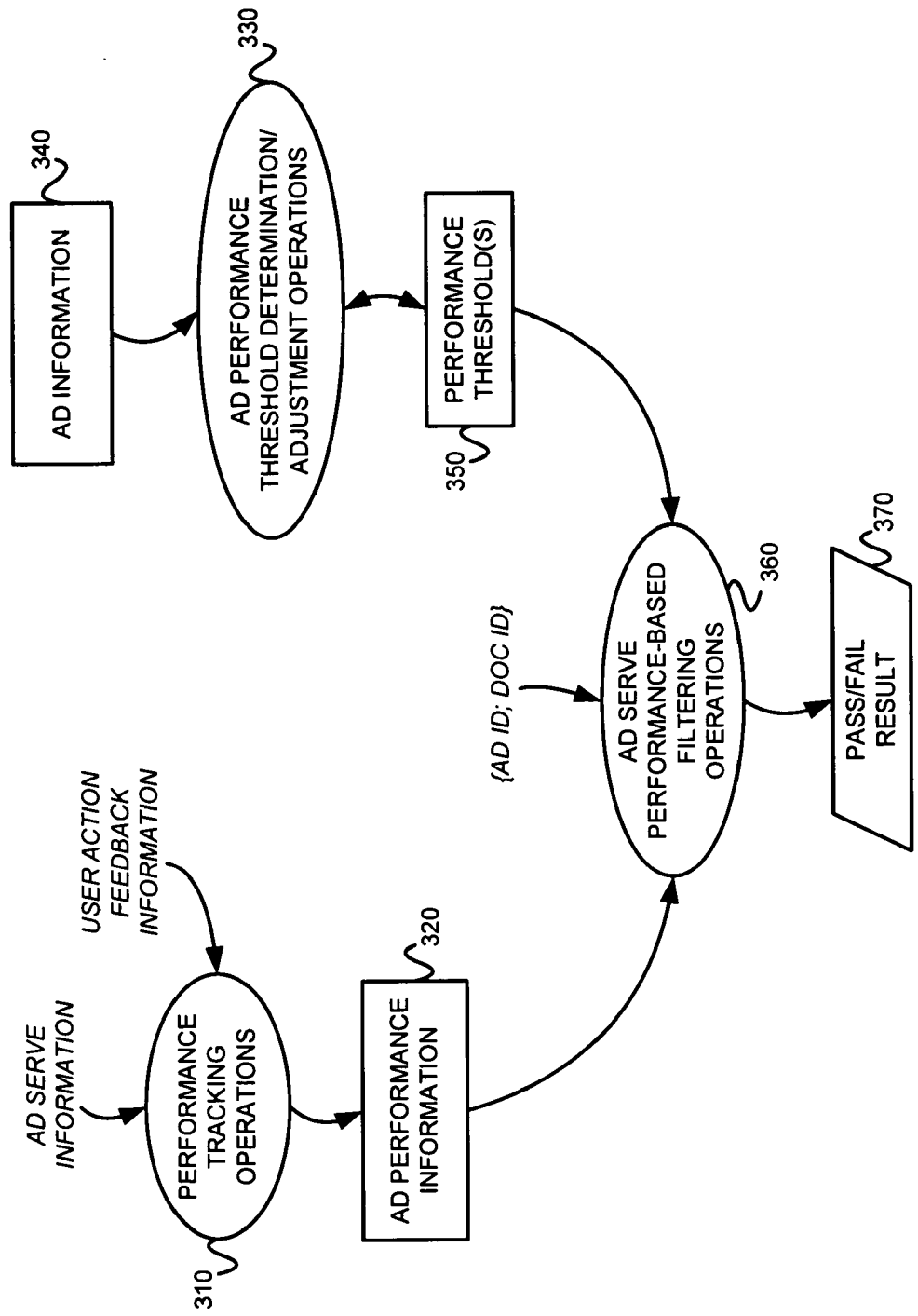
FIG. 3 is a bubble diagram of exemplary operations that may be performed in a manner consistent with the present invention, as well as information that may be used and/or generated by such operations.

The present invention may involve novel methods, apparatus, message formats, and/or data structures for improving ad serving by adjusting a performance threshold (and or a performance value of an ad). The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, specific examples illustrating the utility of one exemplary embodiment of the present invention are provided in §4.4. Finally, some conclusions regarding the present invention are set forth in §4.5.

§4.1 Definitions

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 Exemplary Advertising Environments in which, or with which, the Present Invention may Operate FIG. 1 is a diagram of an advertising environment. The environment may include an ad entry, maintenance and delivery system (sometimes referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), etc. A search engine 220 may permit user devices 250 to search collections of documents (e.g., Web pages). A content server 230 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

The offline content provider 232 may provide information about ad spots in an upcoming publication, and perhaps the publication (e.g., the content or topics or concepts of the content), to the ad server 210. In response, the ad server 210 may provide a set of ads relevant to the content of the publication for at least some of the ad spots. Examples of offline content providers 232 include, for example, magazine publishers, newspaper publishers, book publishers, offline music publishers, offline video game publishers, a theatrical production, a concert, a sports event, etc.

Owners of the offline ad spot properties 234 may provide information about ad spots in their offline property (e.g., a stadium scoreboard banner ad for an NBA game in San Antonio, Tex.). In response, the ad sever may provide a set of ads relevant to the property for at least some of the ad spots. Examples of offline properties 234 include, for example, a billboard, a stadium score board, and outfield wall, the side of truck trailer, etc.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

FIG. 3 is a bubble diagram of exemplary operations that may be performed in a manner consistent with the present invention, as well as information that may be used and/or generated by such operations. The operations include performance tracking operations 310, ad performance threshold determination and/or adjustment operations 330, and ad performance-based filtering operations 360.

Performance tracking operations 310 track the performance of various ads in various environments using ad serve information and user action feedback information (e.g., selection, call-through, click-through, and/or conversion results of previous ad impressions). This information is processed and saved as ad performance information 320. An exemplary data structure that may be used to store performance information 320 in a manner consistent with the present invention is described below with reference to FIG. 4.

Ad performance threshold determination/adjustment operations 330 use ad information 340 (e.g., ad budget, amount of budget spent, amount of budget remaining, etc.), and or other information (not shown) to determine an initial performance threshold or thresholds 350. Alternatively, the initial performance threshold(s) 350 may be a predetermined or random value. The initial threshold 350 may be used (e.g., by ad serve performance-based filtering operations 360) for a predetermined period of time, or alternatively until a condition is satisfied (e.g., a predetermined amount of retrieved ad campaign spending data is received, a predetermined amount (absolute or percentage) of an ad budget is spent, etc.) before an adjustment is made. At such a time, actual spend data may be used to determine whether or not a target amount (budget) is projected to be underspent or overspent. An adjustment to the performance threshold is made accordingly. Even if the initial performance threshold is chosen randomly, the adjustments will cause it to converge to a value that causes, or is intended to cause, a desired result (e.g., target budget exactly spent).

If a budget overspend is predicted (e.g., the spend rate is too high), the performance threshold is increased. This will result in fewer ads served (but they should be more desirable (e.g., in terms of CTR, CR, etc.)), thereby reducing the spend rate. Conversely, if a budget surplus is predicted (e.g., the spend rate is too low), the performance threshold is decreased. This will result in more ad placements (but less desirable (e.g., in terms of CTR, CR, etc.)), thereby increasing the spend rate. However, in either case, the resultant threshold should yield a more effective set of ads than a random or more arbitrary selection of a subset of the possible ad placements to meet a target amount (budget).

The performance threshold can either be adjusted directly, as described above, or effectively by an indirect means, such as by adjusting the ad performance information 320. For example, instead of (or in addition to) decreasing (or increasing) the performance threshold with the ad performance threshold operations 330, the ad performance information 320 could be increased (or decreased), yielding the same overall result.

Ad serve performance-based filtering operations 360 may use an accepted ad identifier and document identifier to determine appropriate ad information 340 and an appropriate performance threshold 350. Ad serve performance-based filtering operations 360 use this information to determine whether or not to filter out (i.e., not serve) the ad on the document instance. This determination may be output as a pass/fail result 370.

§4.3.1 Exemplary Methods and Data Structures

Figure 4:
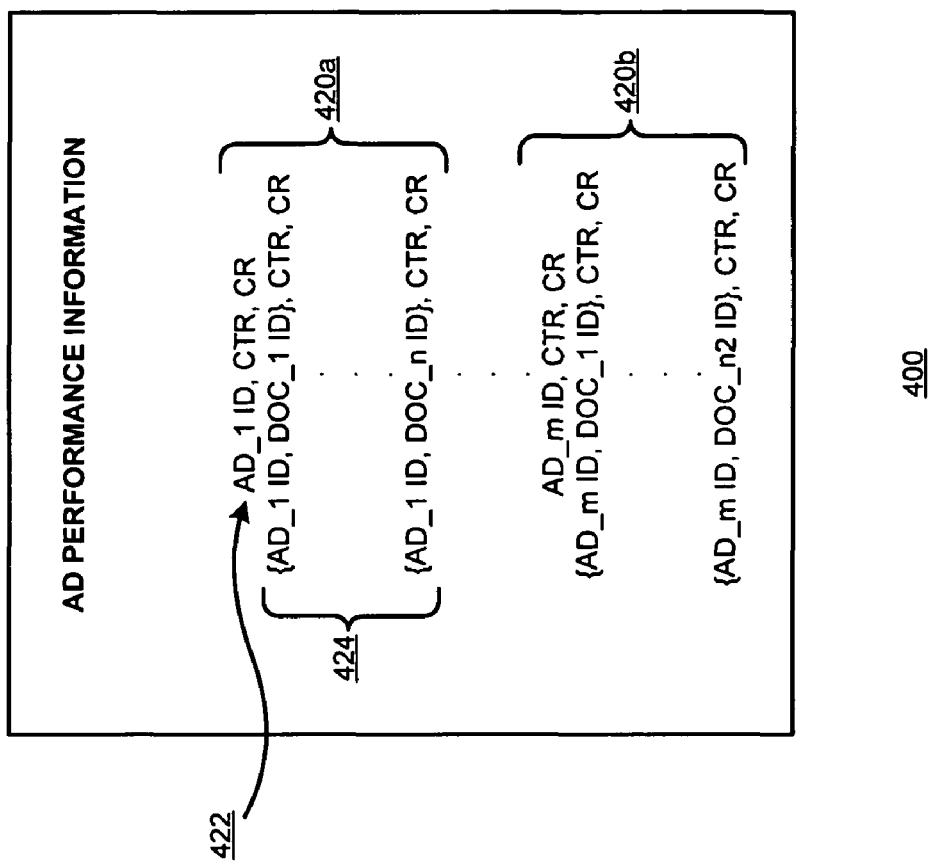
FIG. 4 illustrates an exemplary data structure for storing ad performance information in a manner consistent with the present invention.

FIG. 4 illustrates an exemplary data structure 400 for storing ad performance information in a manner consistent with the present invention. The ad performance information 400 includes data sets for each ad (420a for AD_1 through 420b for AD_m, etc.). Each data set may include (1) the overall CTR for an identified ad, and/or the overall CR for an identified ad 422, and (2) per document CTRs, and/or CRs for the identified ad 424. This data 424 may be used by the ad serve performance-based filtering operations 360 of FIG. 3.

Figure 5:
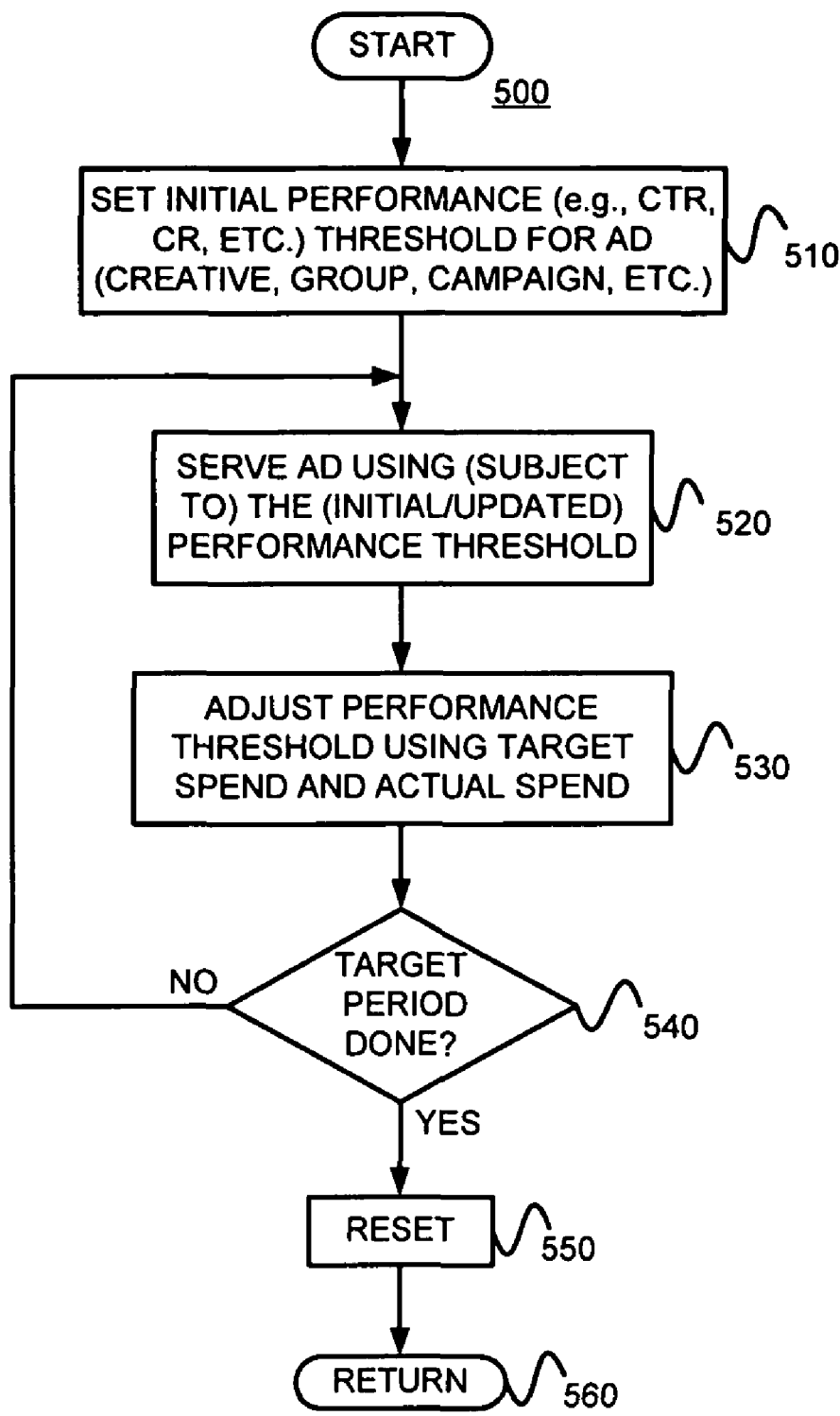
FIG. 5 is a flow diagram of an exemplary method for controlling ad serving by adjusting a performance threshold in a manner consistent with the present invention.

FIG. 5 is a flow diagram of an exemplary method 500 for controlling ad serving by adjusting a performance threshold in a manner consistent with the present invention. An initial performance threshold for the proposed ad is set. (Block 510) This threshold could be a CTR, a CR, or some other performance threshold(s).

The threshold may be chosen to result in the actual amount spent for the ad or campaign to match the target amount (budget) for the ad(s) over a given time period. However, this is not necessary since any initial threshold will be adjusted so that the budget is spent exactly (no overspend or underspend), or at least the threshold will be adjusted with the objective of meeting this goal. If more than one ad is contemplated for a particular group or campaign (corresponding to the group of ads that the budget applies to), initial performance thresholds may be established for each of the ads.

The performance threshold is used to determine whether the ad will be served or not, depending on the expected performance of the ad in the proposed setting. If the expected performance equals or exceeds the threshold, the ad will be served (perhaps subject to other conditions); otherwise, it will not.

(Block 520)

If the ad is served, the amount spent should increase, and if the ad is not served, the amount spent will not increase. Using actual spend information (e.g., comparing actual spending (possibly over a number of potential ad placements) with a target spend), an overspend or underspend of the target amount (budget) can be estimated and the performance threshold can be adjusted accordingly. (Block 530) Specifically, if the target amount is expected to be overspent, the performance threshold should be increased. If the target amount is expected to be underspent, the performance threshold should be decreased. This spending analysis can be done using techniques such as those described in U.S. patent application Ser. No. 10/340,553 (incorporated herein by reference and referred to as "the '553 application"), titled "GOVERNING THE SERVING OF ADVERTISEMENTS BASED ON A COST TARGET," filed on Jan. 10, 2003 and listing Eric Veach as the inventor.

The performance threshold does not need to be updated every time an ad is served. The threshold could be adjusted periodically, upon on a predetermined number of ads being served, upon a predetermined amount or percentage of a target spend being spent, or upon the occurrence of some other condition or conditions.

A determination is made as to whether the target period for the ad being served is done. (Block 540) If so, the system is reset (Block 550) before the method 500 is left (Node 560). Otherwise, the method 500 branches back to block 520.

Figure 6:
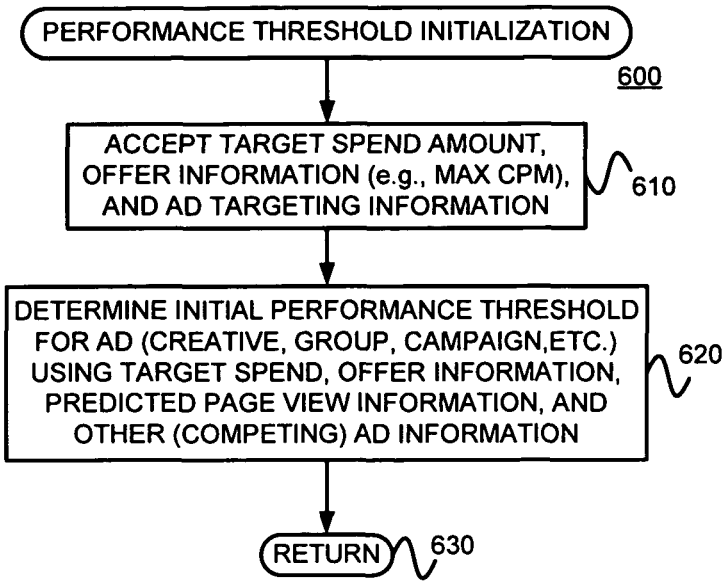
FIG. 6 is a flow diagram of an exemplary method for initializing a performance threshold in a manner consistent with the present invention.

FIG. 6 is a flow diagram of an exemplary method 600 for initializing a performance threshold 600 in a manner consistent with the present invention. Target spend amount (budget), offer information (CPM bid, maximum CPM bid, etc.), and ad targeting information for the ad (or group of ads) under consideration are accepted. (Block 610) Then, an initial performance threshold may be determined for the ad(s), taking into consideration one or more of the target spend amount, offer information, predicted page view information, and other ad information, such as the likely competitive bidding for other ads. It is assumed that without a performance threshold, and if no other controls or limitations on ads served are in place, the ads would be served in excess of the budget. That is, it is assumed that there are excess page views, or more generally, excess "ad spot inventory". The initial threshold may be set with the goal of having a predicted spend (or spend rate) equal to a target spend (or spend rate).

Figure 7:
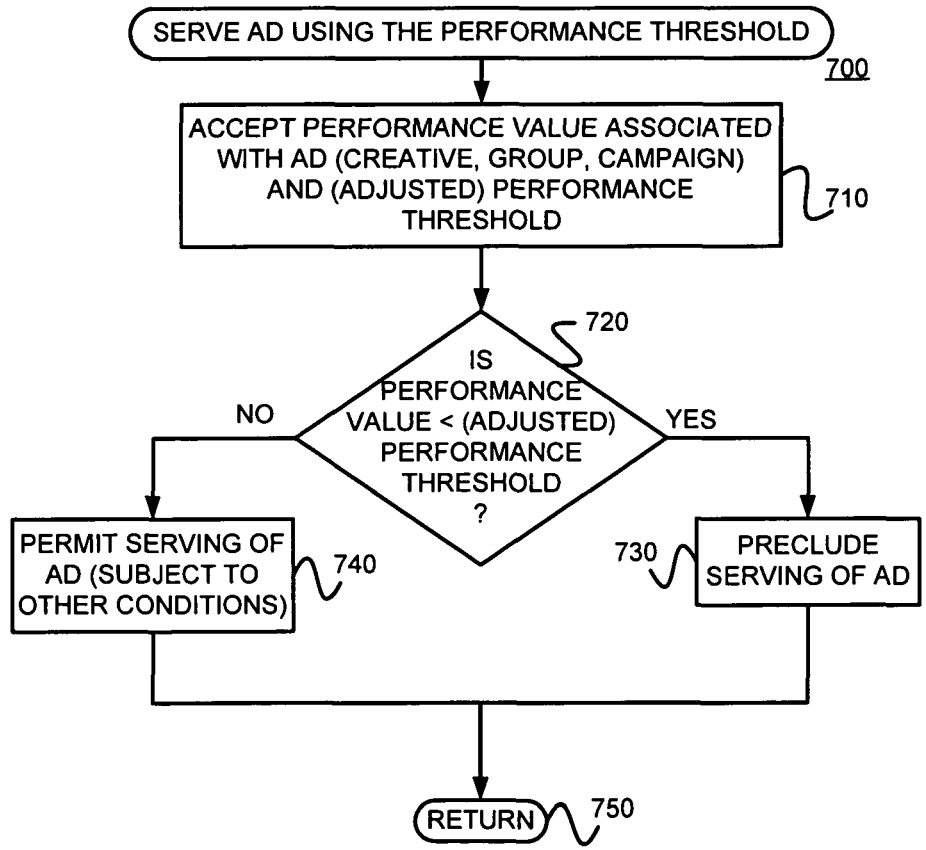
FIG. 7 is a flow diagram of an exemplary method for serving an ad using a performance threshold in a manner consistent with the present invention.

FIG. 7 is a flow diagram of an exemplary method 700 for serving an ad using a performance threshold in a manner consistent with the present invention. A performance value associated with an ad to possibly be served in a particular document, and a performance threshold (either an initial performance threshold if no adjustments have been made, or an adjusted performance threshold) for the ad are accepted. (Block 710) The performance value is compared to the (e.g., adjusted) performance threshold. (Block 720) If the performance value is less than the (e.g., adjusted) performance threshold, the serving of the ad is precluded. (Block 730) If, on the other hand, the (e.g., adjusted) performance value is not less than the performance threshold, serving the ad is permitted, perhaps subject to other conditions or constraints. (Block 740) As an example of an additional condition, there might be a check to see whether the budget would be exceeded by serving the ad, in which case the serving might be precluded.

The method 700 may be performed for each proposed serving of the ad. The performance threshold could be updated after each serving of the ad, or could be updated after a predetermined time period, after a predetermined number of ads have been served, after a predetermined amount has been spent, after a predetermined percentage of a target amount has been spent, or subject to the occurrence of some other condition or conditions.

Figure 8:
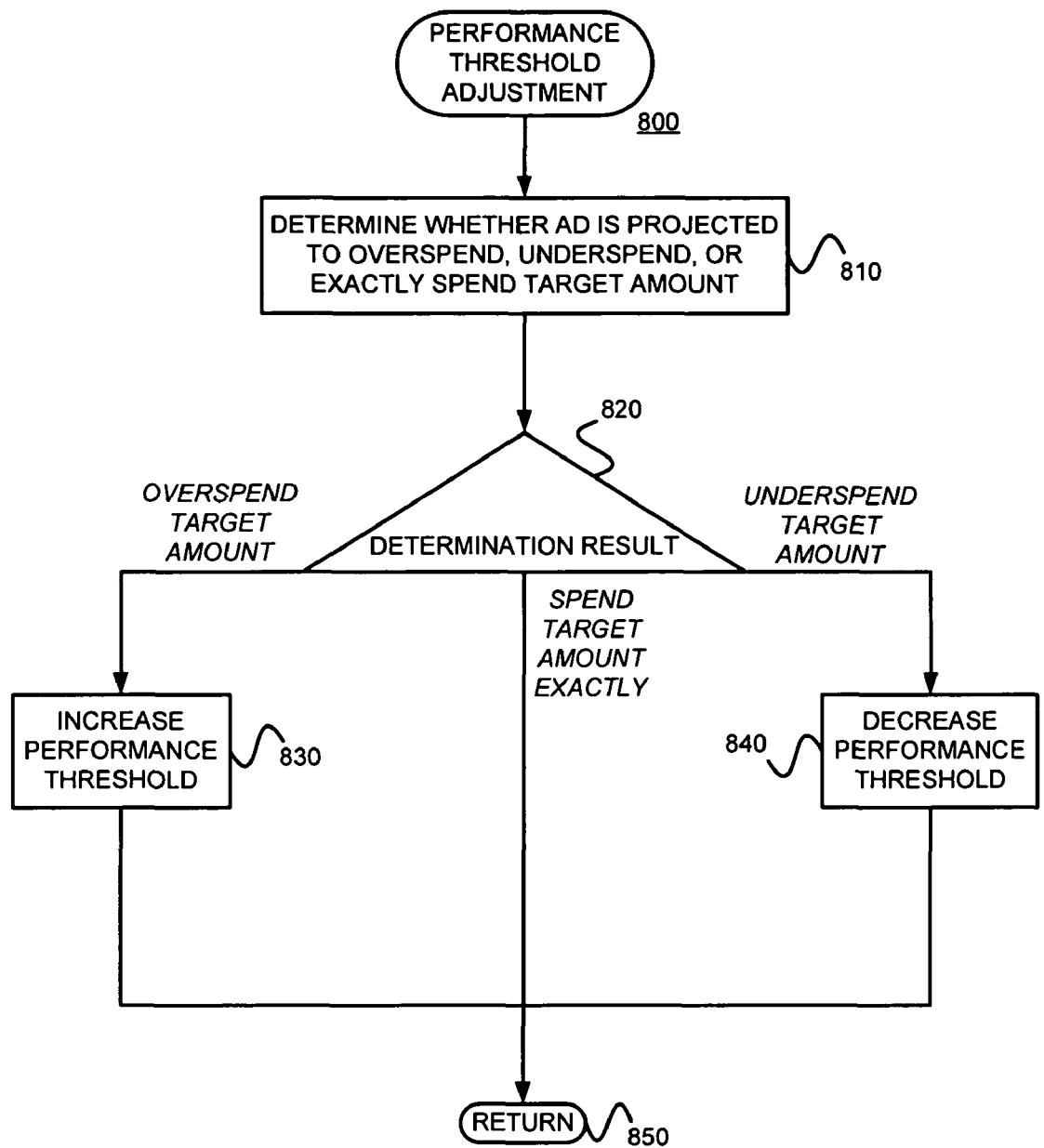
FIG. 8 is a flow diagram of an exemplary method for adjusting a performance threshold in a manner consistent with the present invention.

FIG. 8 is a flow diagram of an exemplary method 800 for adjusting a performance threshold in a manner consistent with the present invention. A determination is made as to whether the ad is projected to overspend, underspend, or exactly spend the target amount. (Block 810) Referring to event block 820, if an overspend of the target amount (budget) is predicted, the performance threshold is decreased. (Block 830) If, on the other hand, an underspend of the target amount is predicted, the performance threshold is decreased. (Block 840) If the spending is predicted to match the target amount, then the method 800 is left without adjusting the performance threshold. (Node 850)

There are various ways of controlling the volatility of the adjustment process in relation to the speed at which the threshold value will converge to a value which target amount will be spent exactly, or with that goal. For example, if the amount of adjustment of the performance threshold is reduced, stability will increase, but convergence may take longer. Conversely, if the amount of adjustment is increased, convergence may occur faster, but at the risk of instability (e.g., unbounded oscillations). In at least some embodiments consistent with the present invention, the amount of the adjustment may be a function of one or more of (i) a degree (amount or percentage) of predicted overspend or underspend, (ii) a time remaining in the budget period, (iii) a number (e.g., an expected number) of remaining threshold adjustments, etc.

§4.3.2 Exemplary Apparatus

Figure 9:
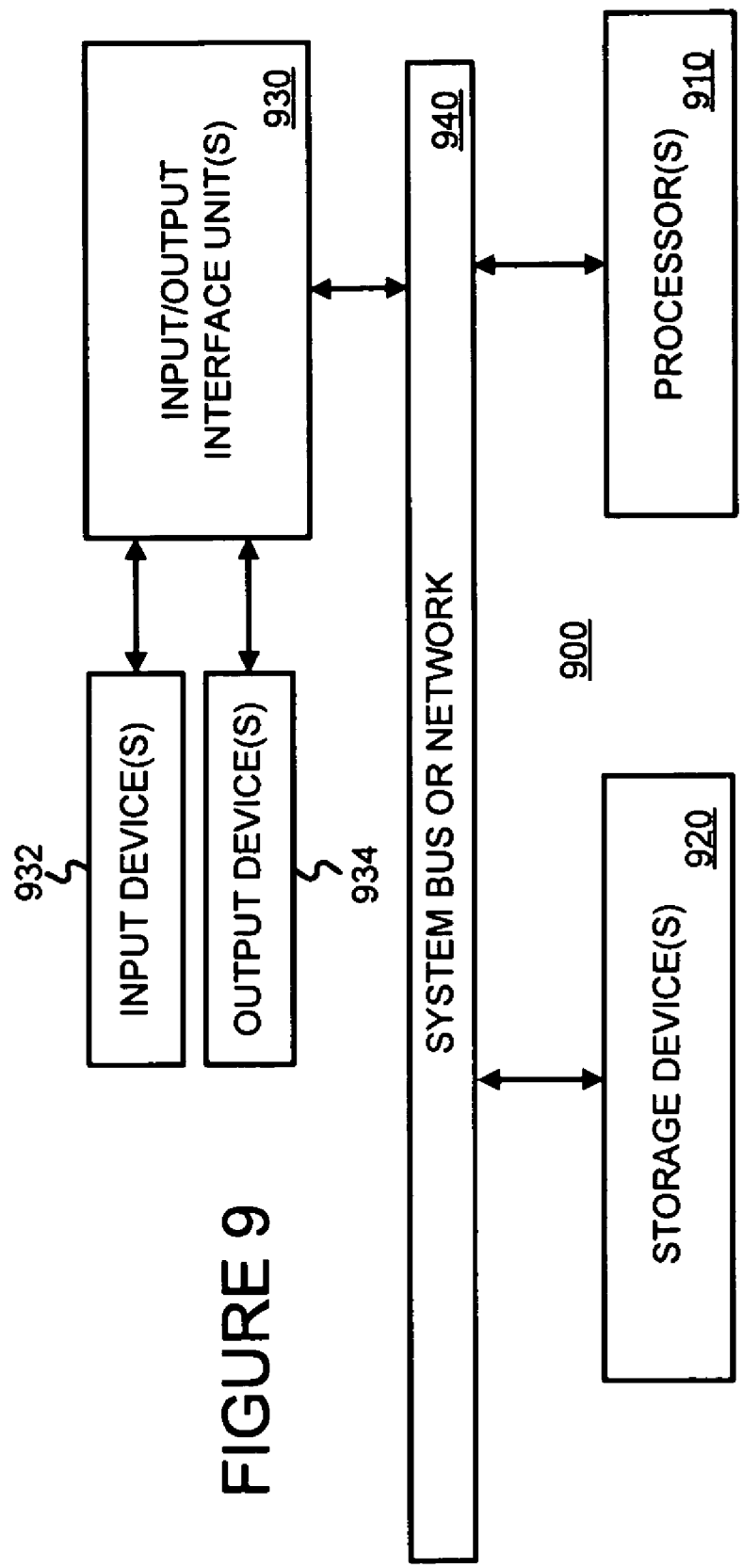
FIG. 9 is a block diagram of apparatus that may be used to perform at least some operations, and store at least some information, in a manner consistent with the present invention.

FIG. 9 is a block diagram of apparatus 900 that may be used to perform at least some operations, and store at least some information, in a manner consistent with the present invention. The apparatus 900 basically includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

Referring back to FIG. 2, one or more machines 900 may be used as end user client devices 250, content servers 230, search engines 220, email servers 240, and/or ad servers 210.

§4.3.3 Refinements and Alternatives

At least some embodiments consistent with the present invention use estimated selection rates (such as CTR) and/or conversion rates (CR) as performance information. The estimates can be updated periodically with actual results for the ad, and/or for those of similar ads. Alternatively, actual rates could be used, where available, in place of estimated rates. Techniques, such as those described in U.S. patent application Ser. No. 10/350,910 (incorporated herein by reference and referred to as "the '910 application"), titled "ESTIMATING USER BEHAVIOR AND USING SUCH ESTIMATES", filed on Jan. 24, 2003 and listing Eric Veach as the inventor, for example, may be used to estimate performance information.

Referring back to FIGS. 5 and 8, actual spending may be checked against a target spending rate, and/or against one or more target budgets or budget rules. The former case need not be tied to a specific time. For example, if an advertiser specifies that it wants to spend $7,000.00 per week, an actual spend rate may be checked against any one of equivalent target spend rates of $7000.00 per week, $1000.00 per day, $41.67 per hour, etc. However, in the latter case, an actual spend may be checked against a number of target budgets and/or budget rules. For example, an advertiser may set a quarterly budget of $X, but specify the following budget rules: no more than $2/3× (200% overspend) in any given month; and no more than $2.5/13× (250% overspend) in any given month. Embodiments consistent with the present invention may use one or both of these checks.

Although many of the exemplary embodiments described above expressed value in terms of ad CTR or CR, value may be expressed in other terms. For example, an advertiser may express value using various factors (factors which reflect value to the advertiser) in a linear (e.g., weighted sum), polynomial, or exponential function. Examples of such factors include getting as many impressions as possible in a given location, at a given time of day, day of week, time of month, time of year, etc., to a given user or user type, to a given user client device or type of user client device, getting as many cheap impressions as possible, etc. Embodiments consistent with the present invention may maximize such an expression of value, subject to attempting to achieve a target spend.

The performance threshold may be adjusted in fixed amounts, or the extent of adjustments may be a function of one or more of the amount of the projected overspend or underspend, the time (or number of additional updates) until the end of the relevant budget period, etc.

In the case of cost per selection offer ads, embodiments consistent with the present invention could be used to improve conversions or to improve some other performance parameter. The performance threshold used should correspond to the type of improvement sought.

At least some embodiments consistent with the present invention may specify an absolute minimum performance threshold (performance floor) such that the performance threshold cannot be adjusted to a value below such an absolute minimum. Although this might result in an underspend of a target amount, such an outcome might be preferred to serving poorly performing ads.

§4.4 Examples of Operations

In the following simple examples, assume that a given advertiser has a budget of $518 per day, with a cost per thousand impressions (CPM) of $2. This would mean that 259,200 ad impressions could occur per day, which equates to 3 ad impressions per second. Assume further that the number of document instances that would meet the advertiser's criteria for serving the ad (and that would be available to this advertiser based on a bid of $2 CPM) would amount to 6 placements per second. Therefore, this advertiser's ad should be served on one-half the possible opportunities, in order to spend the target amount specified by the budget.

A common way to accomplish this today would be to place the ad at every other opportunity (50%) or with a 50% probability. Let's assume that this would result in the average selection rate (CTR) of 5%.

The following table shows three (3) seconds worth of relevant document instances (six (6) per second) that meet the ad serving criteria, showing the expected CTR of the ad for each document instance. Note that for a given row, each document instance is likely to be a different document for each second. That is, the $n^{th}$ document instance is likely not the same document in the first, second, and third seconds. As can be seen, the average CTR in each second (average of the 6 document CTRs) is 5%.

| candidate/time doc/ | $1^{st}$ sec | $2^{nd}$ sec | $3^{rd}$ sec |
|---|---|---|---|
| $1^{st}$ doc | 4% | 8% | 3% |
| $2^{nd}$ doc | 6% | 3% | 6% |
| $3^{rd}$ doc | 5% | 6% | 6% |
| $4^{th}$ doc | 6% | 3% | 5% |
| $5^{th}$ doc | 4% | 2% | 7% |
| $6^{th}$ doc | 5% | 8% | 3% |

An existing system might operate by taking the first, third and fifth available placements each second, thereby realizing the correct number of impressions to meet the budget. In this case, the CTRs for the first, third and fifth document instances in the $1^{st}$ second would be 4%, 5%, and 4%; for the $2^{nd}$ second 8%, 6%, and 2%; and for the $3^{rd}$ second 3%, 6%, and 7%, respectively. This averages out to 5% CTR, which matches the average CTR of all possible placements.

The present invention would utilize an initial performance threshold (assume it's 6%). During the $1^{st}$ second, the first, third, fifth and sixth document instances would not be selected, because each of their expected CTRs is below the threshold of 6%. The second and fourth documents would be selected (6%, and 6%). This would result in the ad being placed two (2) times in the first second. Because the target spend rate (budget) allows for the purchase of three (3) ad impressions per second, this ad rate (2/second) results in a spend rate that is too low. Therefore, the performance threshold of 6% would be decreased, say to 5%.

At a 5% performance threshold for the $2^{nd}$ second, the first, third and last document instances (8%, 6% and 8%) would be chosen, but the expected CTRs of the other document instances are below the new threshold of 5%, and would therefore not be chosen for this ad. This would mean that three ads were placed in the $2^{nd}$ second. Since the ad was placed five (5) times in the first two seconds, this is still too low for the budgeted spend rate of three (3) servings per second. Consequently, the 5% performance threshold would be decreased again, say to 4%.

The $3^{rd}$ second would result in four (4) ad servings. Specifically, the second-fifth document instances all meet the adjusted performance threshold of 4% and consequently the ad would be served with these document instances. The others would not be served.

For this example, the budget spend rate of 3 ad impressions per second was met, but the average CTR of the ads served is 6.44% (=(6+6+8+6+8+6+6+5+7)/9), which would be better for the advertiser than other techniques which would result in the average CTR being 5%.

As a further example, assume that the initial performance threshold was chosen as 4% instead of 6%. Under this scenario, all the ad would be served with all six (6) document instances in the $1^{st}$ second. Because "too many" ads were served (based on the target spending rate of 3 servings per second), the performance threshold would be raised, say to 5% for the $2^{nd}$ second. This would result in an additional serving of the ad with three (3) documents (first, third and sixth documents, with CTRs of 8%, 6% and 8%, respectively). However, since the total ads served in the first two seconds would then be 9, which is still in excess of the targeted spend rate of 6 for each two second period, the performance threshold would again be raised, assume from 5% to 6% for the $3^{rd}$ second. This would result in 3 ads being served in the $3^{rd}$ second.

Under this second scenario, 12 ads are served in three seconds, which evidences an overspend. The average CTR of the ads served is 5.92% (=(4+6+5+6+4+5+8+6+8+6+6+7)/12), which would be better foe the advertiser than other techniques which would result in the average CTR being 5%.

It can be observed that even though more ads are being placed than the budgeted spend rate, as the performance threshold is increased, less ads will be served, and eventually the ad serving rate will equal the target spend rate. In this example, the ads actually served have an average CTR above the overall average CTR of 5%.

An alternative approach would be to stop the serving of ads whenever the budgeted spend rate would be exceeded. In this example, with an initial performance threshold of 5%, the ad would be served 3 times in the $1^{st}$ second, but since there were more potential ad placements after the 3 ad/second allotment was used up, the threshold would be increased (in this case, to 6%). At 6%, only 3 ad servings would occur in the $2^{nd}$ second, and since the budgeted spend rate was achieved, the threshold would be maintained at 6%. At a 6% performance threshold, three ad servings would take place in the $3^{rd}$ second. The average CTR for ads served in this example would be 6.44% (=(6+5+6+8+6+8+6+6+7)/9).

The present invention is not limited to the specific examples provided above. For example, as mentioned above, the spending analysis can be done using techniques such as those described in the '553 application. Specifically, an expected overspend or underspend can be predicted in a number of ways, for a number of different time periods. The amount and frequency of adjustments may be determined in a number of different ways.

§4.5 Conclusions

As can be appreciated from the foregoing, embodiments consistent with the present invention can be used to improve ad placements so that they are better for users, advertisers, and publishers, while having the desired effect of spending a target amount (budget). Embodiments consistent with the present invention employing a feedback control means are easier to implement, and should provide better results, than a-priori optimization of some representation of value subject to spending rate or spending budget constraints.

What is claimed is:

1. A computer-implemented method comprising:
  a) serving, with an advertisement system including at least one computer, an advertisement subject to a first performance threshold such that the advertisement may be served only if a performance value associated with the advertisement meets the first performance threshold and such that the advertisement is otherwise precluded from being served;
  b) tracking, with the advertisement system, an actual spend rate associated with the serving of the advertisement;
  c) adjusting, with the advertisement system, the first performance threshold, using the actual spend rate associated with the serving of the advertisement and a target spend rate associated with the serving of the advertisement, to define a second performance threshold; and
  d) serving, with the advertisement system, the advertisement subject to the second performance threshold such that the advertisement may be served only if the performance value associated with the advertisement meets the second performance threshold and the advertisement is otherwise precluded from being served.

2. The computer-implemented method of claim 1 wherein the performance is selection rate.

3. The computer-implemented method of claim 2 wherein the each of the first and second selection rate thresholds is a minimum click through rate.

4. The computer-implemented method of claim 2, wherein the act of serving, with the advertisement system, an advertisement subject to the first selection rate threshold includes
  i) determining a document on which the advertisement is to be served,
  ii) accepting a per-document selection rate for the advertisement, and
  iii) serving the advertisement with the document only if the per-document selection rate for the advertisement is greater than or equal to the first selection rate threshold.

5. The computer-implemented method of claim 2 wherein the act of adjusting the first selection rate threshold, using the actual spend rate associated with the advertisement and a target spend rate associated with the advertisement, to define a second selection rate threshold includes
  i) determining whether or not the actual spend rate is greater than the target spend rate, and
  ii) if it is determined that the actual spend rate is greater than the target spend rate, then increasing the first selection rate threshold to define the second selection rate threshold.

6. The computer-implemented method of claim 2 wherein the act of adjusting the first selection rate threshold, using the actual spend rate associated with the advertisement and a target spend rate associated with the advertisement, to define a second selection rate threshold includes
  i) determining whether or not the actual spend rate is less than the target spend rate, and
  ii) if it is determined that the actual spend rate is less than the target spend rate, then decreasing the first selection rate threshold to define the second selection rate threshold.

7. The computer-implemented method of claim 1 wherein the performance is conversion rate.

8. The computer-implemented method of claim 1 wherein an advertiser associated with the advertisement has agreed to pay for impressions of the advertisement.

9. A computer-implemented method comprising:
  a) serving, with an advertisement system including at least one computer, an advertisement subject to a plurality of performance thresholds such that the advertisement may be served only if a per-document performance information associated with the advertisement meets a first performance threshold and such that the advertisement is otherwise precluded from being served;
  b) tracking, with the advertisement system, the per document performance information for the advertisement;
  c) serving, with the advertisement system, the advertisement subject to the first performance threshold by
    i) determining a document on which the advertisement is to be served, and ii) serving the advertisement with the document only if the per-document performance information for the advertisement is greater than or equal to the first performance threshold and otherwise precluding the serving of the advertisement;

d) tracking, with the advertisement system, an actual spend rate associated with the serving of the advertisement;

e) adjusting, with the advertisement system, the first performance threshold, using the actual spend rate associated with the serving of the advertisement and a target spend rate associated with the serving of the advertisement, to define a second performance threshold; and f) serving, with the advertisement system, the advertisement subject to the second performance threshold such that the advertisement may be served only if the per-document performance information meets the second performance threshold and such that the advertisement is otherwise precluded from being served.

10. The computer-implemented method of claim 9 wherein the performance is selection rate.

11. The computer-implemented method of claim 10 wherein the act of adjusting the first selection rate threshold, using the actual spend rate associated with the advertisement and a target spend rate associated with the advertisement, to define a second selection rate threshold includes
    i) determining whether or not the actual spend rate is greater than the target spend rate, and
    ii) if it is determined that the actual spend rate is greater than the target spend rate, then increasing the first selection rate threshold to define the second selection rate threshold.

12. The computer-implemented method of claim 10 wherein the act of adjusting the first selection rate threshold, using the actual spend rate associated with the advertisement and a target spend rate associated with the advertisement, to define a second selection rate threshold includes
    i) determining whether or not the actual spend rate is less than the target spend rate, and
    ii) if it is determined that the actual spend rate is less than the target spend rate, then decreasing the first selection rate threshold to define the second selection rate threshold.

13. The computer-implemented method of claim 9 wherein the performance is conversion rate.

14. The computer-implemented method of claim 9 wherein an advertiser associated with the advertisement has agreed to pay for impressions of the advertisement.

15. A computer-implemented method comprising:
    a) accepting, with an advertisement system including at least one computer, an advertising budget for an advertisement;
    b) serving, with the advertisement system, the advertisement subject to a performance threshold such that the advertisement may be served only if a performance value associated with the advertisement meets the performance threshold and such that the advertisement is otherwise precluded from being served; and
    c) adjusting, with the advertisement system, at least one of (A) the performance threshold and (B) an expected performance value of the advertisement, to increase a value of impressions of the advertisement subject to the advertising budget of the advertisement being spent.

16. The computer-implemented method of claim 15 wherein the performance is selection rate.

17. The computer-implemented method of claim 15 wherein the performance is conversion rate.

18. The computer-implemented method of claim 15, further comprising:
    d) accepting, with the advertisement system, additional budget rules for the advertisement, wherein the act of adjusting at least one of (A) the performance threshold and (B) an expected performance value of the advertisement, to increase a value of impressions of the advertisement is further subject to the additional budget rules.

19. The computer-implemented method of claim 15 wherein the performance is a function including one or more advertiser-specified value-expressing factors.

20. The computer-implemented method of claim 19, wherein at least one of the one or more advertiser-specified value-expressing factors is a value of impressions in a given location.

21. The computer-implemented method of claim 19, wherein at least one of the one or more advertiser-specified value-expressing factors is a value of impressions in a given time frame.

22. The computer-implemented method of claim 19, wherein at least one of the one or more advertiser-specified value-expressing factors is a value of impressions to a given user or type of user.

23. The computer-implemented method of claim 19, wherein at least one of the one or more advertiser-specified value-expressing factors is a value of impressions to a given user client device or type of user client device.

24. The computer-implemented method of claim 15 wherein the act of adjusting the performance threshold to increase a value of the impressions of the advertisement subject to the budget of the advertisement being spent includes adjusting the performance threshold to be as high as possible subject to the budget of the advertisement being spent.

25. Apparatus for serving an advertisement subject to a first performance threshold, the apparatus comprising:
    a) one or more processors;
    b) at least an input device for accepting a target spend rate associated with the serving of the advertisement; and
    c) one or more storage devices storing processor-executable instructions which, when executed by the one or more processors, perform a method of
        1) tracking an actual spend rate associated with the serving of the advertisement,
        2) adjusting the first performance threshold, using the actual spend rate associated with the serving of the advertisement and the target spend rate associated with the serving of the advertisement, to define a second performance threshold, and
        3) serving the advertisement subject to the second performance threshold such that the advertisement may be served only if a performance value associated with the advertisement meets the second performance threshold and such that the advertisement is otherwise precluded from being served.

26. The apparatus of claim 25 wherein the performance is selection rate.

27. The apparatus of claim 26 wherein the each of the first and second selection rate thresholds is a minimum click through rate.

28. The apparatus of claim 26, wherein the method further includes
    4) determining a document on which the advertisement is to be served,
    5) accepting a per-document selection rate for the advertisement, and 6) serving the advertisement with the document only if the per-document selection rate for the advertisement is greater than or equal to the first selection rate threshold.

29. The apparatus of claim 26, wherein the method further includes
4) determining whether or not the actual spend rate is greater than the target spend rate, and
5) increasing the first selection rate threshold to define the second selection rate threshold if it is determined that the actual spend rate is greater than the target spend rate.

30. The apparatus of claim 26, wherein the method further includes
4) determining whether or not the actual spend rate is less than the target spend rate, and
5) decreasing the first selection rate threshold to define the second selection rate threshold if it is determined that the actual spend rate is less than the target spend rate.

31. The apparatus of claim 25 wherein the performance is conversion rate.

32. Apparatus comprising:
a) one or more processors;
b) at least an input device for accepting an advertising budget for an advertisement; and
c) one or more storage devices storing processor-executable instructions which, when executed by the one or more processors, perform a method of
1) serving the advertisement subject to a performance threshold such that the advertisement may be served only if a performance value associated with the advertisement meets the performance threshold and such that the advertisement is otherwise precluded from being served, and
2) adjusting at least one of (A) the performance threshold and (B) an expected performance value of the advertisement, to increase a value of impressions of the advertisement subject to the advertising budget of the advertisement being spent.

33. The apparatus of claim 32 wherein the performance is selection rate.

34. The apparatus of claim 32 wherein the performance is conversion rate.

35. The apparatus of claim 32, wherein the act of adjusting includes adjusting the performance threshold to be as high as possible subject to the advertising budget of the advertisement being spent.

36. A non-transitory machine readable storage medium having machine executable instructions stored thereon, which when executed by a machine, perform a method comprising:
a) serving, with an advertisement system including at least one computer, an advertisement subject to a first performance threshold such that the advertisement may be served only if a performance value associated with the advertisement meets the first performance threshold and such that the advertisement is otherwise precluded from being served;
b) tracking, with the advertisement system, an actual spend rate associated with the serving of the advertisement;
c) adjusting, with the advertisement system, the first performance threshold, using the actual spend rate associated with the serving of the advertisement and a target spend rate associated with the serving of the advertisement, to define a second performance threshold; and
d) serving, with the advertisement system, the advertisement subject to the second performance threshold such that the advertisement may be served only if the performance value associated with the advertisement meets the second performance threshold and the advertisement is otherwise precluded from being served.

37. A non-transitory machine readable storage medium having machine executable instructions stored thereon, which when executed by a machine, perform a method comprising:
a) serving, with an advertisement system including at least one computer, an advertisement subject to a plurality of performance thresholds such that the advertisement may be served only if a per-document performance information associated with the advertisement meets a first performance threshold and such that the advertisement is otherwise precluded from being served;
b) tracking, with the advertisement system, the per document performance information for the advertisement;
c) serving, with the advertisement system, the advertisement subject to the first performance threshold by
i) determining a document on which the advertisement is to be served, and
ii) serving the advertisement with the document only if the per-document performance information for the advertisement is greater than or equal to the first performance threshold and otherwise precluding the serving of the advertisement;
d) tracking, with the advertisement system, an actual spend rate associated with the serving of the advertisement;
e) adjusting, with the advertisement system, the first performance threshold, using the actual spend rate associated with the serving of the advertisement and a target spend rate associated with the serving of the advertisement, to define a second performance threshold; and
f) serving, with the advertisement system, the advertisement subject to the second performance threshold such that the advertisement may be served only if the per-document performance information meets the second performance threshold and such that the advertisement is otherwise precluded from being served.

38. A non-transitory machine readable storage medium having machine executable instructions stored thereon, which when executed by a machine, perform a method comprising:
a) accepting, with an advertisement system including at least one computer, an advertising budget for an advertisement;
b) serving, with the advertisement system, the advertisement subject to a performance threshold such that the advertisement may be served only if a performance value associated with the advertisement meets the performance threshold and such that the advertisement is otherwise precluded from being served; and
c) adjusting, with the advertisement system, at least one of (A) the performance threshold and (B) an expected performance value of the advertisement, to increase a value of impressions of the advertisement subject to the advertising budget of the advertisement being spent.

* * * * *